United States Patent
Ophir et al.

(10) Patent No.: US 7,922,874 B2
(45) Date of Patent: Apr. 12, 2011

(54) MULTI-EFFECT EVAPORATOR

(75) Inventors: Avraham Ophir, Herzlia (IL); Joseph Weinberg, Netanaya (IL)

(73) Assignee: I.D.E. Technologies Ltd., Kadima (IL)

( * ) Notice: Subject to any disclaimer, the term of this patent is extended or adjusted under 35 U.S.C. 154(b) by 494 days.

(21) Appl. No.: 11/885,664

(22) PCT Filed: Mar. 7, 2006

(86) PCT No.: PCT/IL2006/000302
§ 371 (c)(1),
(2), (4) Date: Sep. 5, 2007

(87) PCT Pub. No.: WO2006/095340
PCT Pub. Date: Sep. 14, 2006

(65) Prior Publication Data
US 2008/0164136 A1 Jul. 10, 2008

Related U.S. Application Data

(60) Provisional application No. 60/658,588, filed on Mar. 7, 2005.

(51) Int. Cl.
*B01D 1/26* (2006.01)
*B01D 3/14* (2006.01)

(52) U.S. Cl. ...... 202/174; 159/17.1; 159/17.2; 159/26.1; 159/DIG. 8; 159/DIG. 15; 202/154; 202/155; 202/176; 202/267.1; 203/10; 203/71; 203/86; 203/100

(58) Field of Classification Search ......... 159/17.1, 159/17.2, 26.1, DIG. 8, DIG. 15, DIG. 40; 202/153–155, 174, 176, 267.1; 203/10, 39, 203/71, 86, 100; 210/664, 668
See application file for complete search history.

(56) References Cited

U.S. PATENT DOCUMENTS

| | | | | |
|---|---|---|---|---|
| 3,323,575 A | * | 6/1967 | Greenfield | 159/13.2 |
| 3,351,120 A | | 11/1967 | Goeldner et al. | |
| 3,420,747 A | * | 1/1969 | Williamson | 202/173 |
| 3,807,479 A | | 4/1974 | Brannland et al. | |
| 3,849,259 A | * | 11/1974 | Steinbruchel | 202/174 |
| 3,868,308 A | | 2/1975 | Barak et al. | |
| 3,968,002 A | * | 7/1976 | Standiford | 159/13.2 |
| 5,582,690 A | | 12/1996 | Weinberger et al. | |
| 5,849,148 A | * | 12/1998 | Walker | 159/13.2 |

FOREIGN PATENT DOCUMENTS

| | | |
|---|---|---|
| BE | 880441 | 4/1980 |
| FR | 2 867 771 A1 | 9/2005 |
| GB | 2 195 908 A | 4/1988 |
| JP | 43-27728 | 11/1967 |
| WO | 95/01824 A1 | 1/1995 |
| WO | 2005/078371 A2 | 8/2005 |

* cited by examiner

*Primary Examiner* — Virginia Manoharan
(74) *Attorney, Agent, or Firm* — Graeser Assoc. International; Dvorah Graeser

(57) ABSTRACT

A multi-effect evaporator, having an upstream and a downstream end, adapted for distillation of water. It comprises a plurality of effects serially connected and arranged into groups. Each group has a common parallel water feed inlet adapted to supply all effects in the group with feed water. The evaporator further includes a main feed water line in fluid communication with the most upstream group. An array of heaters is disposed along the line, adapted for heating the feed water before its entry into the effects of the latter group. Each effect comprises means for forwarding the second outlet vapor into one of the heaters for heating the feed water. Each group comprises a pump adapted to extract the concentrate from the effects of the group and pump it into the common parallel water feed of an adjacent downstream group.

5 Claims, 2 Drawing Sheets

MULTI-EFFECT EVAPORATOR

CROSS-REFERENCE

This is a National Phase Application filed under 35 U.S.C. 371 of International Application No. PCT/IL2006/000302, filed Mar. 7, 2006, claiming the benefit under 35 USC 119(e) of U.S. Provisional Application No. 60/658,588, filed Mar. 7, 2005, the entire contents of each of which is hereby incorporated herein by reference in its entirety.

FIELD OF THE INVENTION

This invention relates to distillation installations and methods, in particular a method using multi-effect evaporators.

BACKGROUND OF THE INVENTION

Distillation of water is a process in which various soluble materials such as salt, contaminants etc. are eliminated from water containing these materials, leaving clean, usually drinkable water. One known method for achieving such distillation relies on water evaporation, much like salt and scale being accumulated on the bottom of an electric kettle after water has evaporated. In this process during evaporation of the water, soluble materials that are not volatile remain in a solid state residue, usually in the form of salt and scale, and are disposed of. The vapor can then be condensed back into a state of liquid, resulting in contaminant free water.

U.S. Pat. No. 3,868,308 to the Applicant discloses a multiple effect evaporator system, comprising a housing and a plurality of effects connected in a series to one another, each effect having a plurality of bundles of tubes. The system is built such that high temperature steam is introduced into the tubes of the first effect, while non-distilled water is sprayed against the outside of the tubes, causing the vapor in the tube to condense while evaporating a part of the non-distilled water. The remainder of steam from the tubes of the first effect, along with the evaporated water outside the tubes enters the tubes of the adjacent downstream effect, while the remainder of the non-distilled water which has not evaporated, is accumulated at the bottom of the effect housing in the form of a concentrate and is moved to be sprayed against the outside of the tubes of the adjacent upstream effect and so on and so forth.

Once water has completed its passage through all the effects of the evaporator system, the process yields distilled water on the downstream end of the evaporator and a warm concentrate in the form of a highly concentrated water solution of soluble materials on the upstream end.

SUMMARY OF THE INVENTION

According to the present invention there is provided a multi-effect evaporator adapted for distillation of water, comprising a plurality of effects connected in a series manner and arranged into groups including a most upstream group and subsequent downstream groups, each group having a most upstream effect and a most downstream effect and having a common parallel water feed inlet adapted to supply all effects in said group with feed water; the evaporator further including a main feed water line in fluid communication with the most upstream group; an array of heaters disposed along said line and adapted for heating said feed water before its entry into the effects of the most upstream group; each effect comprising heat transfer means adapted to receive an inlet vapor and produce from the feed water a first outlet vapor, leaving the remainder of the feed water as a concentrate, and to condense a part of the inlet vapor to produce distilled water, leaving the remainder of the first inlet vapor as a second outlet vapor; each effect comprising means for forwarding the first outlet vapor into an adjacent downstream effect, where it will constitute said first inlet vapor, and means for forwarding said second outlet vapor into one of said heaters for heating said feed water thereby; each group further comprising a pump adapted to extract the concentrate from the effects of said group and pump it into the common parallel water feed of an adjacent downstream group; and means for collecting the distilled water.

In one embodiment of the invention, the heat transfer means in each effect comprises a plurality of tubes with inter-tube spaces therebetween, the tubes being adapted for receiving the inlet vapor, and contacting the feed water to cause a heat transfer therebetween, resulting in the vaporization of a part of the feed water in the inter-tube spaces, to produce said first outlet vapor, leaving the remainder of the feed water as a concentrate, and resulting in the condensation of a part of the inlet vapor in the tubes, to produce the distilled water, leaving the remainder of the inlet vapor as the second outlet vapor. The tubes are further adapted for channeling the condensed water and the second outlet vapor from one side of the effect to the other.

The parallel water feed inlet in each group of the effects may comprise dispersion means adapted to introduce said feed into each of said effects of the group so as to allow its contact with the tubes. The water feed may be introduced into the dispersion means in various forms, e.g. thin film form, and temperatures, allowing optimization of the heat transfer and overall desalination process.

The number of effects comprised in one group may vary according to the water feed rate, water temperature and additional factors. The group formation may hold up to 30 effects maintaining high efficiency factors.

The tube bundle may be of any material allowing reasonable heat transfer between the vapor inside the tube and water on the exterior of the tube, such as aluminum or other metals or metal alloys. In operation, the tubes may be positioned horizontally or tilted at an angle as to aid the condensed vapor within the tubes to flow down to the opposite end of the effect by force of gravity. The tube shape is not restricted to a circular cross section and may be of other shapes, for example oval.

Further modifications may be made to the evaporator such as galvanization of the condenser tubes, adding ion traps, using various alloys for the condenser tubes etc.

BRIEF DESCRIPTION OF THE DRAWINGS

In order to understand the invention and to see how it may be carried out in practice, one embodiment of the present invention will now be described, by way of non-limiting example only, with reference to the accompanying drawings, in which.

DETAILED DESCRIPTION OF EXEMPLARY EMBODIMENTS

Figure 1:
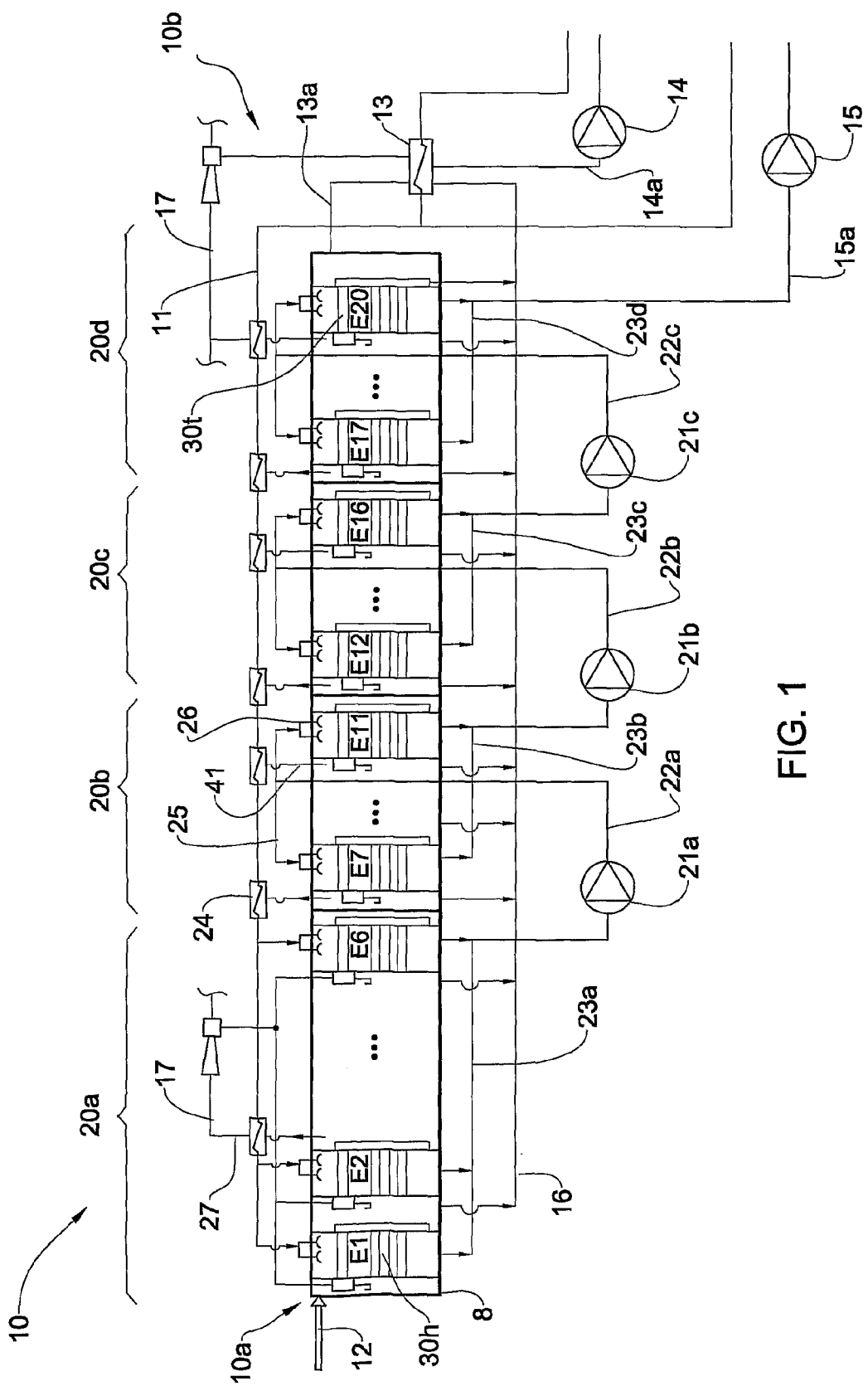
FIG. 1 is a schematic view of a multi-effect evaporator according to one embodiment of the present invention, showing only the first and last effects of each of the groups.
Figures 2, 3:
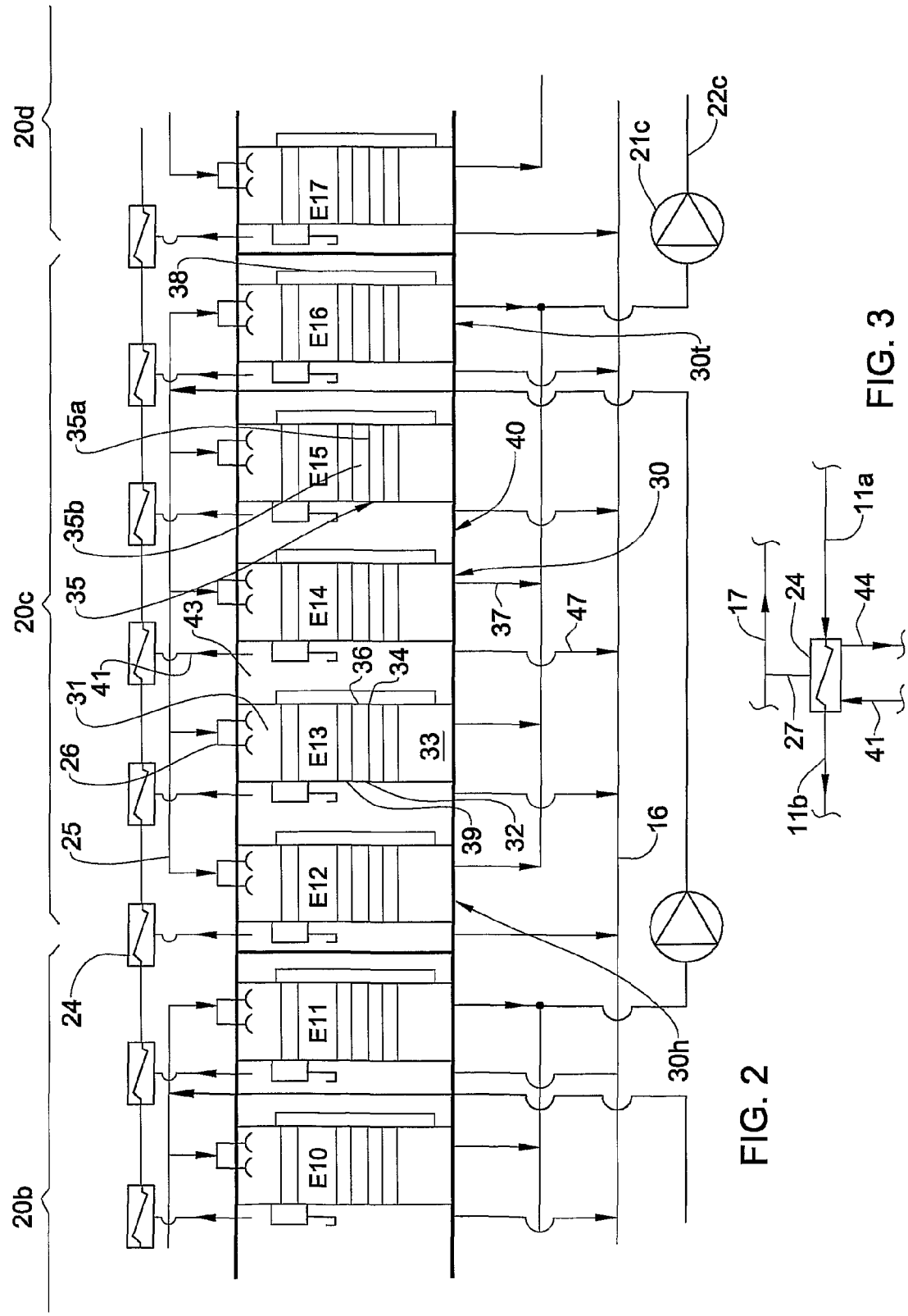
FIG. 2 is an enlarged view of group 20c with upstream and downstream effects of the adjacent groups 20b, 20d of the evaporator shown in FIG. 1.
FIG. 3 is a schematic view of a feed heater used in the multi-effect evaporator shown in FIGS. 1 and 2.

FIGS. 1 and 2 show a multi-effect evaporator system 10 together with its main water feed line 11 extending above and along the evaporator 10 from its downstream end 10b to its upstream end 10a, and with its main vapor feed line 11 associated with the upstream end 10a of the evaporator. The evaporator 10 is adapted for the distillation of water entering it from the main water feed line 11 using vapor entering it from the main vapor feed line 12.

The evaporator 10 comprises a housing 8 and four groups of effects designated as 20a to 20d, disposed therein, group 20a being the upstream-most group and group 20d being the downstream-most group. The evaporator 10 further comprises a condenser 13 adapted to condense vapor remains from the distillation process, a distilled water main line 16 adapted to collect distilled water produced by the evaporator, a product pump 14 adapted to withdraw from the evaporator the distilled water, and a brine pump 15 adapted to withdraw from the evaporator brine left after the distillation. The condenser and both pumps are located at the downstream end of the system.

The water feed line 11 is provided with a plurality of heaters 24, each having a heater vapor inlet 41 adapted to receive vapor from each group 20 and to heat thereby the water in the feed line 11. Each heater 24 further comprises a first outlet 27 (shown in FIG. 3 and in FIG. 1 only for the most upstream and downstream heaters of the groups 20a and 20d respectively) used for removing non-condensable gasses (NCG) and remaining vapor, in fluid communication with an NCG and vapor removal line 17, and a second outlet 44 for withdrawal of water therefrom.

Each group of effects 20a to 20d comprises a plurality of effects 30 and a plurality of inlet chambers 40 connected in series with the effects so that each effect 30 has on its upstream side an inlet chamber 40. The effects are denoted E1 to E20, the most upstream and downstream effects of each effects group 20 being designated as 30h and 30t, respectively. Groups 20a, 20b, 20c and 20d hold within them effects E1 to E6, E7 to E11, E12 to E16, and E17 to E20 respectively.

Each of the effects groups 20 also comprises a common parallel water inlet 25 divided into dispersion means 26, each adapted to introduce feed-water in a thin film form into one of the effects 30. Each group 20 further comprises a concentrate drainage line 23 and a concentrate pump 21 connected therewith, both adapted to withdraw concentrate from the group 20, the pump 21 being adapted to introduce the concentrate into the water inlet 25 of the subsequent downstream group.

Each effect 30 comprises at its top a main water inlet 31 adapted to receive water to be distilled from the dispersion means 26; a vapor inlet 32 located on the upstream side of the effect; and a concentrate collector 33 at the bottom of the effect in fluid communication with the concentrate drainage line 23 of the effect's group. The vapor inlet 32 of the most upstream effect 30h of the first group 20a is in fluid communication with the main vapor line 12, whilst the vapor inlet 32 of each of the other effects of each group is adapted to receive vapor, via its preceding inlet chambers 40, from the immediately preceding adjacent upstream effect 30.

Within the effect 30 is located a tube bundle 35, consisting of horizontally coextending condenser tubes 35a of oval or circular cross-sections, with a space 35b therebetween. The upstream ends of the tubes 35a constitute the vapor inlet 32 of the effect, and the downstream ends of the tubes 35a constitute a first, water and vapor outlet 34 of the effect, for vapor and distilled water exiting the tubes, whilst the space 35b between the tubes constitutes a second, vapor outlet 36 of the effect for vapor created from the feed water in the space 35b between the tubes 35a. The tubes are slightly downwardly inclined from the upstream side of the effect to its downstream side to allow water flow therein using gravitational forces. The tubes are located under the main inlet 31 to allow feed water from the dispersion means 26 to be sprayed thereon, to cause heat transfer between the vapor flowing within the tubes and the sprayed water. The ends of the tubes 35 are supported by and arranged within vertical tube sheets 39.

Each effect further comprises a concentrate outflow line 37 which connects the concentrate collector 33 of each effect 30 with the concentrate drainage line 23. The concentrate pump 21 of each group 20 is connected to the downstream end of the drainage line 23.

As mentioned above, the inlet chamber 40 is disposed between each pair of two adjacent effects 30, one effect being on the upstream side of the chamber and the other being on the downstream side of the chamber. The chamber 40 is adapted to receive water and vapor from first and second outlets 34 and 36 of the effect located on the upstream side of the chamber. The chamber is designed to allow vapor from outlet 34 to flow into the vapor inlet 32 of the effect 30 located on the downstream side of the chamber. The chamber also has at its top a vapor outlet 43 via which the vapor from outlet 36 is diverted to the vapor inlet 41 of the corresponding heater 24. The chamber 40 further comprises a droplet separator 38 located at the vapor outlets 34,36 of each effect and a distilled water collector 42 located at the bottom of the chamber, adapted to receive the distilled water from the first outlet 34 of the effect on the upstream side of the chamber. Connected to each distilled water collector 42 is a distilled water outflow line 47 leading to the distilled water main line 16.

It should be appreciated that although described here to be common parallel drainages for both concentrate and distilled water, the concentrate collectors 33 may be connected in series to one another, and the distilled water collectors 42 may also be connected to one another in a series manner.

The heaters 24 may each be associated with one group 20 or with one inlet chamber 20 of each group 20, as shown in the drawings.

The main water feed line 11 and vapor feed line 12 are connected to the first effect 30h of the first group 20a. The condenser 13 is in fluid communication with the water and vapor outlet 34 of the last effect 30t of the last group 20d via pipe-line 13a and the brine pump 15 is in fluid communication with the concentrate drainage line 23 of the last group 20d via pipe-line 15a.

In operation, feed water is introduced from an external source into the feed line 11 on the downstream end of the system, at about 25° C., and passed along the feed line 11 through the heaters 24. The heaters 24 gradually heat the feed water until it is introduced into the common parallel water inlet 25 and the dispersion means 26 of the first group 20a. The heating of the water is such that it reaches the first effect 30h of the first group 20a at its highest temperature which may reach 82-85° C. At the same time, vapor at a temperature slightly above 85° C. is introduced into the vapor inlet 32 of the first effect, i.e. into the upstream ends of the tubes 35a of the first group 20a.

The water from the feed line is sprayed downwards from the main water inlet 25 using dispersion means 26 which spray it in thin film form, i.e. about 0.2-0.3 mm, onto the tubes 35a of each of the effects 30 of the first group 20a. Upon the contact of the water film with the tubes 35a, a heat transfer process takes place between this film and the vapor flowing within the tubes 35a, resulting in partial condensation of the vapor in the tubes 35 and partial evaporation of the feed water in the space 35b between the tubes.

The vapor that has condensed in the tubes 35a constitutes the distilled water and flows by force of gravity down the tubes, which are inclined, into the inlet chamber 40 located at the downstream end of the tubes, where it drips down to the distilled water collector 42. The distilled water flows down from the collector 42 of each inlet chamber 40 to the distilled water main line 16 via the outflow line 47. The remainder of the vapor that has not condensed in the tubes 35a, flows into the inlet chamber 40 and is sucked via the vapor outlet 43 into the vapor inlet 41 of the respective heater 24 that utilizes the hot vapor to heat the feed water in the main water feed line 11.

The feed water that has turned into vapor in the space 35b between the tubes 35a of the effect is forwarded via the chamber 40 to the vapor inlet 32, and the upstream ends of the tubes 35a, of the next, immediately adjacent effect. The feed water that has not evaporated, namely the concentrate, drips down to the concentrate collector 33 at the bottom of the effect 30, from which the concentrate flows down into the concentrate drainage line 23 of the first group 20a.

The concentrate is then pumped from the concentrate drainage line 23 using a concentrate pump 21 via pipe-line 22 into the common parallel water inlet 25 of the second group 20b, where the process is repeated in this and subsequent groups, with the only difference between the first group 20a and all the subsequent groups 20b to 20d, that the first group 20a receives feed water from the main water feed line 11 while the other groups receive feed water from the concentrate pumps 21. Thus, the feed water and the vapor both move downstream during the process, the evaporator system thus being a forward feed flow multi-effect evaporator.

The feed heater 24 shown in FIG. 3 is adapted to receive feed water through the inlet 11a and hot vapor with NCG through the inlet 41 and allowing heat transfer between the two. This process yields heated feed water leaving the heater 24 through the outlet 11b and condensed vapor, constituting distilled water, leaving the heater 24 through outlet 44. The vapor that has not condensed is removed through outlet 27 via NCG and vapor line 17. The outlet 44 may be in fluid communication with the distilled water collector 42 of the inlet chamber 40 or with the distilled water main line 16.

The above described process produces distilled water and obtains the most highly concentrated brine at its lowest temperature due to the forward feed flow, as opposed to backward feed flow where the brine is produced at the highest temperature. Low temperature brine allows preventing the danger of scale and corrosion of the installation. The brine is removed from the system using a brine pump 15 via pipe-line 15a connected to the last concentrate drainage 23d. At the downstream end of the system the distilled water from the distilled water main line 16 is introduced into a condenser 13 via the pipe-line 13a, where it utilized to condense the vapor coming from the last effect 30t of the last group 20d. From the condenser 13, the product pumps 14 pumps out the distilled water using the pipe-line 14a.

The operation of the above described multi-effect evaporator 10 may be further modified and enhanced by various means such as ion traps for heavy metals, pre-de-aeration of the water in a titanium tube, galvanic insulation of tubes from tube plates by elastomer grommets and incorporating sacrificial aluminum-magnesium anodes in the submerged section of each effect. Furthermore, various types of water may be used for the process, the most common of which is sea-water. In addition, various numbers of effects for each group and, and a various number of effects altogether may be used in order to yield different results.

Those skilled in the art to which this invention pertains will readily appreciate that numerous changes, variations and modifications can be made without departing from the scope of the invention mutatis mutandis.

The invention claimed is:

1. A multi-effect evaporator for distillation of water, comprising a plurality of effects serially connected and arranged into groups including a most upstream group and subsequent downstream groups, each group having a most upstream effect and a most downstream effect and having a common parallel water feed inlet for supplying all effects in said group with feed water;

the evaporator further including a main feed water line in fluid communication with the most upstream group;

an array of heaters disposed along said line for heating said feed water before its entry into the effects of the most upstream group;

each effect comprising heat transfer means for receiving an inlet vapor and produce from the feed water a first outlet vapor, leaving the remainder of the feed water as a concentrate, and to condense a part of the inlet vapor to produce distilled water, leaving the remainder of the inlet vapor as a second outlet vapor;

each effect further comprising means for forwarding the first outlet vapor into an adjacent downstream effect, where it will constitute said inlet vapor, and means for forwarding said second outlet vapor into one of said heaters for heating said feed water thereby;

each group further comprising a pump for extracting the concentrate from the effects of said group and pump it into the common parallel water feed of an adjacent downstream group; and means for collecting the distilled water, wherein the heat transfer means in each effect comprises a plurality of tubes with inter-tube spaces therebetween, the tubes being for receiving said inlet vapor, and contacting the feed water to cause heat transfer therebetween, resulting in the vaporization of a part of the feed water in the inter-tube spaces, to produce said first outlet vapor, leaving the remainder of the feed water as a concentrate, and resulting in the condensation of a part of the inlet vapor in the tubes, to produce said distilled water, leaving the remainder of the inlet vapor as said second outlet vapor wherein the tubes are galvanic insulated using elastomer grommets.

2. A multi-effect evaporator for distillation of water, comprising a plurality of effects serially connected and arranged into groups including a most upstream group and subsequent downstream groups, each group having a most upstream effect and a most downstream effect and having a common parallel water feed inlet for supplying all effects in said group with feed water;

the evaporator further including a main feed water line in fluid communication with the most upstream group;

an array of heaters disposed along said line for heating said feed water before its entry into the effects of the most upstream group;

each effect comprising heat transfer means for receiving an inlet vapor and produce from the feed water a first outlet vapor, leaving the remainder of the feed water as a concentrate, and to condense a part of the inlet vapor to produce distilled water, leaving the remainder of the inlet vapor as a second outlet vapor;

each effect further comprising means for forwarding the first outlet vapor into an adjacent downstream effect, where it will constitute said inlet vapor, and means for forwarding said second outlet vapor into one of said heaters for heating said feed water thereby;

each group further comprising a pump for extracting the concentrate from the effects of said group and pump it into the common parallel water feed of an adjacent downstream group; and means for collecting the distilled water, wherein the heat transfer means in each effect comprises a plurality of tubes with inter-tube spaces therebetween, the tubes being for receiving said inlet vapor, and contacting the feed water to cause heat transfer therebetween, resulting in the vaporization of a part of the feed water in the inter-tube spaces, to produce said first outlet vapor, leaving the remainder of the feed water as a concentrate, and resulting in the condensation of a part of the inlet vapor in the tubes, to produce said distilled water, leaving the remainder of the inlet vapor as said second outlet vapor, wherein the shape of the tube is oval.

3. A multi-effect evaporator for distillation of water, comprising a plurality of effects serially connected and arranged into groups including a most upstream group and subsequent downstream groups, each group having a most upstream effect and a most downstream effect and having a common parallel water feed inlet for supplying all effects in said group with feed water;

the evaporator further including a main feed water line in fluid communication with the most upstream group;

an array of heaters disposed along said line for heating said feed water before its entry into the effects of the most upstream group;

each effect comprising heat transfer means for receiving an inlet vapor and produce from the feed water a first outlet vapor, leaving the remainder of the feed water as a concentrate, and to condense a part of the inlet vapor to produce distilled water, leaving the remainder of the inlet vapor as a second outlet vapor;

each effect further comprising means for forwarding the first outlet vapor into an adjacent downstream effect, where it will constitute said inlet vapor, and means for forwarding said second outlet vapor into one of said heaters for heating said feed water thereby;

each group further comprising a pump for extracting the concentrate from the effects of said group and pump it into the common parallel water feed of an adjacent downstream group; and means for collecting the distilled water further comprising ion traps used for removal of heavy metals from the water.

4. A multi-effect evaporator for distillation of water, comprising a plurality of effects serially connected and arranged into groups including a most upstream group and subsequent downstream groups, each group having a most upstream effect and a most downstream effect and having a common parallel water feed inlet for supplying all effects in said group with feed water;

the evaporator further including a main feed water line in fluid communication with the most upstream group;

an array of heaters disposed along said line for heating said feed water before its entry into the effects of the most upstream group;

each effect comprising heat transfer means for receiving an inlet vapor and produce from the feed water a first outlet vapor, leaving the remainder of the feed water as a concentrate, and to condense a part of the inlet vapor to produce distilled water, leaving the remainder of the inlet vapor as a second outlet vapor;

each effect further comprising means for forwarding the first outlet vapor into an adjacent downstream effect, where it will constitute said inlet vapor, and means for forwarding said second outlet vapor into one of said heaters for heating said feed water thereby;

each group further comprising a pump for extracting the concentrate from the effects of said group and pump it into the common parallel water feed of an adjacent downstream group; and means for collecting the distilled water, further comprising a titanium tube for pre-de-aeration of the feed water.

5. A multi-effect evaporator for distillation of water, comprising a plurality of effects serially connected and arranged into groups including a most upstream group and subsequent downstream groups, each group having a most upstream effect and a most downstream effect and having a common parallel water feed inlet for supplying all effects in said group with feed water;

the evaporator further including a main feed water line in fluid communication with the most upstream group;

an array of heaters disposed along said line for heating said feed water before its entry into the effects of the most upstream group;

each effect comprising heat transfer means for receiving an inlet vapor and produce from the feed water a first outlet vapor, leaving the remainder of the feed water as a concentrate, and to condense a part of the inlet vapor to produce distilled water, leaving the remainder of the inlet vapor as a second outlet vapor;

each effect further comprising means for forwarding the first outlet vapor into an adjacent downstream effect, where it will constitute said inlet vapor, and means for forwarding said second outlet vapor into one of said heaters for heating said feed water thereby;

each group further comprising a pump for extracting the concentrate from the effects of said group and pump it into the common parallel water feed of an adjacent downstream group; and means for collecting the distilled water, and wherein each effect comprises a collector constituting a submerged section of the effect, and sacrificial aluminum-magnesium anodes incorporated therein.

* * * * *